US009126557B2

(12) United States Patent
Renaudin et al.

(10) Patent No.: US 9,126,557 B2
(45) Date of Patent: Sep. 8, 2015

(54) CHILDCARE DEVICE INCLUDING INFLATABLE SAFETY ELEMENTS

(71) Applicant: Cosco Management, Inc., Wilmington, DE (US)

(72) Inventors: Francois Renaudin, Cholet (FR); Nicolas Garnier, Saint Germain sur Moine (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/508,747

(22) Filed: Oct. 7, 2014

(65) Prior Publication Data

US 2015/0054263 A1 Feb. 26, 2015

Related U.S. Application Data

(63) Continuation-in-part of application No. 13/995,651, filed as application No. PCT/EP2011/073450 on Dec. 20, 2011, now Pat. No. 8,851,514.

(30) Foreign Application Priority Data

Dec. 20, 2010 (FR) ...................................... 10 60856
Feb. 24, 2011 (FR) ...................................... 11 51522

(51) Int. Cl.
*B60R 21/16* (2006.01)
*B60R 21/207* (2006.01)
*B60N 2/28* (2006.01)
*B60R 21/18* (2006.01)
*B60R 22/26* (2006.01)

(52) U.S. Cl.
CPC .......... *B60R 21/2072* (2013.01); *B60N 2/2839* (2013.01); *B60N 2/2884* (2013.01); *B60R 21/16* (2013.01); *B60R 21/18* (2013.01); *B60R 22/26* (2013.01)

(58) Field of Classification Search
CPC ........ B60R 21/16; B60R 21/18; B60R 22/26; B60R 21/2072
See application file for complete search history.

(56) References Cited

U.S. PATENT DOCUMENTS

| 3,827,716 | A | * | 8/1974 | Vaughn et al. | ............. 280/730.1 |
| 4,342,483 | A | | 8/1982 | Takada | |
| 5,368,328 | A | | 11/1994 | Kamiyama et al. | |
| 5,413,377 | A | | 5/1995 | Kamiyama et al. | |
| 6,513,829 | B1 | * | 2/2003 | Zumpano | ................... 280/730.1 |
| 7,997,658 | B2 | | 8/2011 | DeLellis et al. | |

(Continued)

FOREIGN PATENT DOCUMENTS

DE 4418028 A1 11/1995
EP 1031472 A2 8/2000

(Continued)

OTHER PUBLICATIONS

International Preliminary Report on Patentability prepared for PCT/EP2012/000496 and issued on Oct. 29, 2013.

(Continued)

*Primary Examiner* — Faye M Fleming
(74) *Attorney, Agent, or Firm* — Barnes & Thornburg LLP

(57) ABSTRACT

A childcare device is configured to receive a child. The device includes a child-restraint harness including first and second shoulder straps and inflatable elements associated with each shoulder strap.

29 Claims, 5 Drawing Sheets

(56) References Cited

U.S. PATENT DOCUMENTS

| | | | |
|---|---|---|---|
| 8,517,418 | B2 | 8/2013 | Schondorf et al. |
| 8,690,188 | B2 | 4/2014 | Fiore |
| 2014/0042793 | A1* | 2/2014 | Fiore .......................... 297/484 |

FOREIGN PATENT DOCUMENTS

| | | |
|---|---|---|
| GB | 2260780 A | 4/1993 |
| JP | 2004026156 A | 1/2004 |

OTHER PUBLICATIONS

English translation of the International Preliminary Report on Patentability in connection with PCT/EP2011/073450.

International Search Report issued in connection with PCT/EP2011/073450 and completed by the ISA/EP on Feb. 21, 2012.

\* cited by examiner

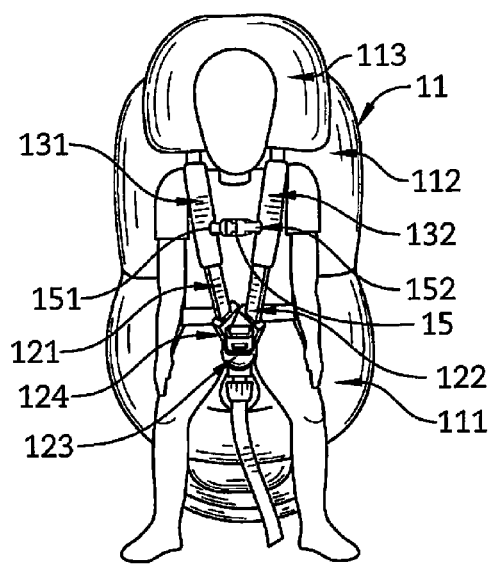
FIG. 1
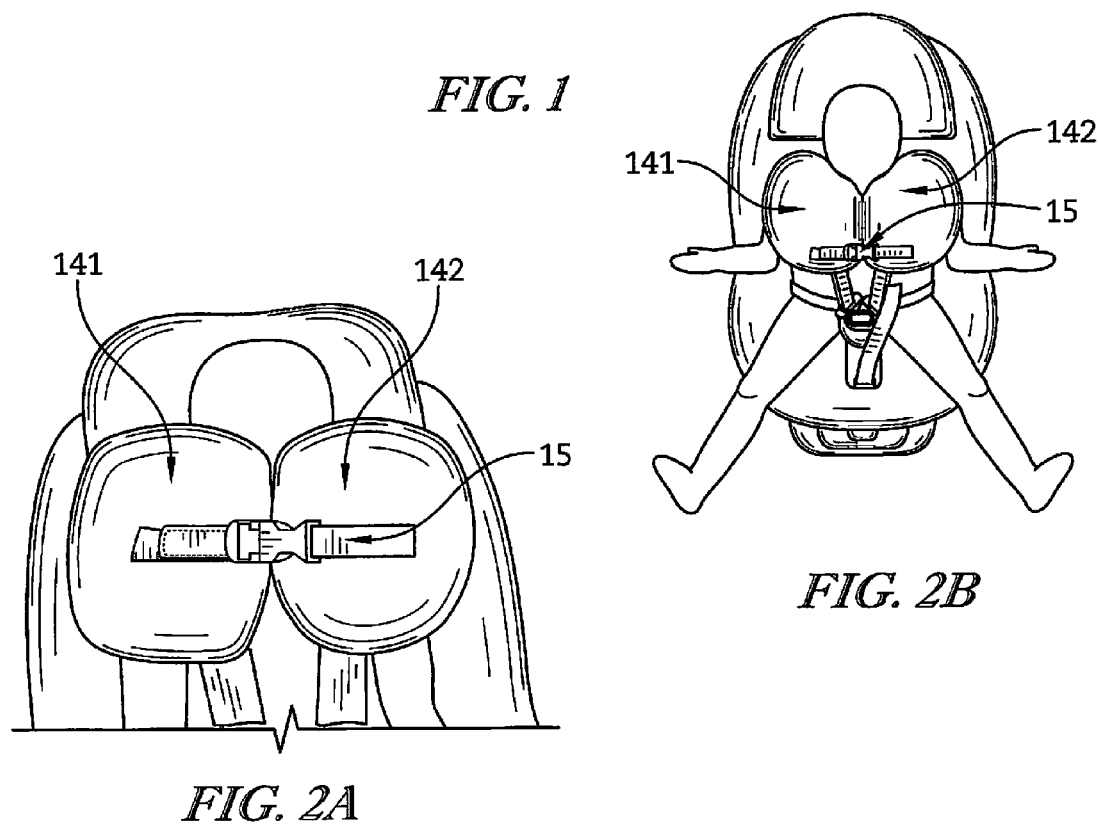
FIG. 2A
FIG. 2B

CHILDCARE DEVICE INCLUDING INFLATABLE SAFETY ELEMENTS

CROSS REFERENCE TO RELATED APPLICATIONS

This application is a continuation-in-part of U.S. application Ser. No. 13/995,651, filed Sep. 9, 2013, which is a US nationalization under 35 USC §371 of International Application No. PCT/EP2011/073450, filed Dec. 20, 2011, which claims priority to French Application No. 1060856, filed Dec. 20, 2010 and French Application No. 1151522, filed Feb. 24, 2011.

The field of the invention is that of child care, and more specifically of devices suitable for receiving a child, particularly in the sitting position. The invention particularly relates to car seats, intended to be attached to a motor vehicle seat or bench seat. It may also be used in devices such as pushchairs, carry cots, bicycle seats, etc.

More specifically, the invention relates to the use of inflatable safety bags, or balloons, or elements, commonly referred to as airbags, the inflation whereof is activated automatically in the event of an impact, to protect the child positioned in the child care device.

The use of airbags is well known, particularly in the motor vehicle sector. More recently, numerous other applications have been envisaged, particularly for children's car seats. However, in the latter case, the solutions envisaged are not completely satisfactory.

It was first envisaged to provide a frontal bag, deploying facing the child (similar to the airbag fitted in a steering wheel, in a vehicle). One drawback of this approach is that this bag needs to be housed in the seat section of the seat, or in a protuberant portion, for example a shield, to the front of said seat section. The bag therefore needs to be large in size and the inflation time thereof is significant, meaning that, in the event of an impact, the child's head is nonetheless moved over an excessive distance.

A further proposed approach consists of providing a plurality of inflatable elements, distributed into a plurality of areas of the seat, as illustrated for example in the document DE4418028. In particular, providing airbags on each of the harness straps has been envisaged. Unfortunately, this technique is ineffective in practice since, in the event of impact, the child's head, which is projected forwards, passes between the two bags, separating them from each other.

Similar problems are encountered in other child care devices.

The aim of the invention is particularly that of remedying at least some of these drawbacks.

More specifically, one aim of the invention is that of providing a child care device enhancing the child's safety in the event of an impact, simply and effectively.

In particular, one aim of the invention is that of providing such a child care device preventing the child's body, and particularly head, being moved over a large distance, in the event of impact.

A further aim of the invention, at least according to some embodiments, is that of providing such a child care device, accounting, for the deployment of the airbag(s), for the size of the child being transported.

These aims, along with others that will emerge hereinafter, are achieved using a child care device suitable for receiving a child, comprising at least two inflatable safety elements suitable for being inflated in the event of an impact above a predetermined threshold, and means for reversibly attaching said inflatable safety elements together.

These attachment means are designed so as to hold said safety elements against each other, when inflated. This approach makes it possible to enhance safety simply and effectively. Indeed, in the event of impact, the child's head is generally projected forwards. In this case, the head tends to slip through the two deployed inflatable elements (or airbags), separating said elements. Movement of the child's body, and particularly the head, would thus not be prevented and the effectiveness thereof is significantly reduced.

The presence of these attachment means makes it possible to hold the two inflatable elements in the sought position, preventing said elements from being separated from each other.

This approach was not obvious for those skilled in the art. Indeed, there is nothing to suggest interconnecting two airbags, while generally seeking not to impair the deployment thereof. Moreover, according to the invention, this attachment is not permanent.

According to one embodiment, the device is provided with a harness having two straps designed for extending from the shoulders along a child's chest, and each equipped with an inflatable safety element, suitable for being inflated in the event of impact over a predetermined threshold.

Reversible fastening means, which are attached when the child is positioned in the seat and detached when positioning or removing the child, are thus envisaged.

Moreover, joining the airbags to the straps makes it possible to limit the movements of the child's body, and particularly the head, the airbag(s) being as close as possible thereto. Furthermore, the bag deployment time is thus limited and the size thereof may be reduced.

Moreover, the implementation of these inflatable elements associated with the straps is simple to implement and use.

The attachment means may for example comprise at least two flexible portions having at the free ends thereof additional coupling means, so as to extend transversally between the straps, when they are attached, and preferably also hold the straps together.

In other words, they further carry out a function, known per se, of connecting the two straps (referred to as a "chest clip" function), in order to prevent the child from slipping his/her arms under the straps. An advantage of this approach is that the user is incited to use this connection, of which at least the "chest clip" function is directly visible. In this way, with a single connection, two operations are carried out, particularly those of attaching both inflatable elements.

The connection may be provided directly between these inflatable elements, or via elements (straps, sleeves, etc.) to which they are attached.

Each of said inflatable safety elements can be attached to one of said straps respectively.

If said straps each have a sleeve that is slidable along the strap, it may be envisaged for said inflatable safety elements to be housed in the sleeves.

This approach offers the advantage of ensuring that the inflatable elements are always correctly positioned, regardless of the child's size. Indeed, the sleeves are moved, according to the child's size, so as to be always positioned at least partly on the shoulders.

According to one particular embodiment, said sleeves have at least one movable flap, suitable for forming a housing for one of said inflatable safety elements.

Each of said inflatable safety elements may particularly be attached to one of said sleeves via two connections, in the vicinity of each of the ends of said sleeve, respectively.

This enables enhanced control of the deployment of the inflatable elements.

In particular, said inflatable safety elements may be attached to said sleeves by stitching. Further suitable attachment means may obviously be envisaged.

According to one particular embodiment, each of said sleeves has a side opening for inserting said attachment means.

According to a further aspect of some embodiments, said inflatable safety elements are configured so as to define, when inflated, lateral protection on the child's neck and the equivalent of a central bag at the child's head, by the end portions thereof connected together by attachment means.

Said inflatable safety elements may be supplied with at least one source of fluid, for example housed in the back section of said seat.

According to a first approach, the device according to the invention may comprise mechanical means for activating the inflation of said inflatable safety elements, comprising at least one fuse or one sensor, for example mounted:
  on a clip for attaching said device to a hook provided for this purpose in a motor vehicle and/or
  on a strap for attaching the upper part of the back section, or a corresponding base, to the motor vehicle, or on means rigidly connected to said strap.

According to a further approach, it may comprise electronic means for activating the inflation of said inflatable safety elements, such as at least one deceleration sensor and/or a control signal output by a vehicle wherein said device is fitted.

More generally, the inflation activation signal may be output by any mechanical and/or electronic means that are self-contained (associated with the child care device) and/or output by the vehicle.

According to a further feature of some embodiments, the device comprises means for detecting the presence of a child, only authorizing the inflation of the inflatable safety elements in the presence of a child in said child care device.

Indeed, it is generally not desirable for the safety elements to be inflated, even in the event of a significant impact (and thus even if activation means require such inflation, if the device is not occupied). This detection may for example be carried out using a weight sensor placed under the seat section, or a suitably positioned contact.

According to one particular embodiment, said detection means are formed or engage with said means for attaching said inflatable safety elements together, and output information relating to the presence of a child when said attachment means are attached.

In this way, it is easy to determine the child's presence, for example via a closed electrical contact when the chest clip is locked. Moreover, the information is directly available in the vicinity of the inflatable elements.

According to another feature, the device may comprise means for detecting a correct installation of the device in a vehicle, only authorizing the inflation of the inflatable safety elements if said child care device is correctly installed.

Notably, said means for detecting a correct installation could comprise sensors to detect the attachment of clips to corresponding hook provided for this purpose in said vehicle.

According to another embodiment, said inflatable safety elements are mounted in a back or a headrest.

According to another embodiment, means for reversibly attaching said inflatable safety elements together are attached together during their inflation.

The child care device may comprise sensors to detect said impact above a predetermined threshold, and notably at least one frontal impact sensor and/or at least one lateral impact sensor.

Further features and advantages of the invention will emerge more clearly on reading the following description of a preferential embodiment of the invention, given merely as an illustrative and non-limitative example, and the appended figures wherein:

FIG. 1 illustrates an example of a car seat according to the invention;

FIGS. 2A and 2B represent the car seat in FIG. 1, the inflatable elements having been deployed;

Figure 3:
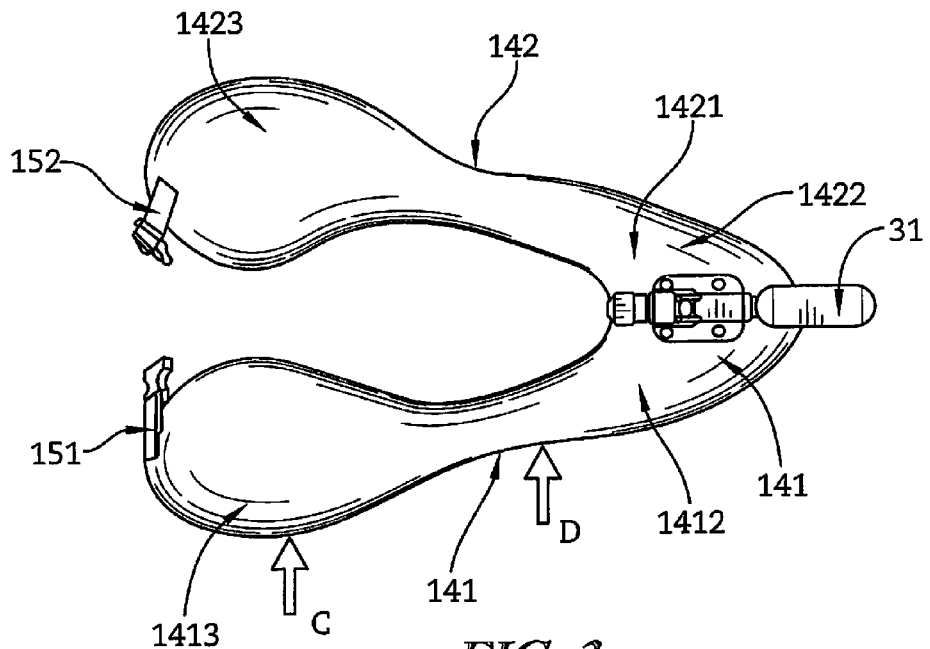
FIG. 3 represents, flat and non-inflated, the airbag used in the seat in FIGS. 1 and 2.

The invention thus offers a novel approach for airbags to be fitted in child care devices. The embodiment described hereinafter relates to child car seats. However, those skilled in the art would understand that the same approach may be readily adapted to other child care devices, provided they are equipped with a harness.

More specifically, as illustrated in FIGS. 1 and 2, the airbags consist of two inflatable elements, each respectively mounted on one of the straps of the child's harness and, more specifically, in the embodiment described, in the sleeves fitted on the straps.

According to the invention, these two elements are further attached together, by attachment means provided for this purpose, at or in the vicinity of the straps. These attachment means are mounted on the inflatable elements, so that they remain attached, and held against each other when deployed.

As seen in FIG. 1, the child car seat 11 conventionally comprises a seat section 111 and a back section 112, having in this case a headrest 113, which may be movable in respect of height, with respect to the back section 112.

The child is held in this seat 11 using a harness 12, comprising two straps 121 and 122, each to be positioned on one of the child's shoulders, and extending substantially vertically on the child's chest, and a crotch guard 123.

When the harness is positioned, the two straps 121 and 122 and the crotch guard 123 are attached by a locking buckle 124. Each strap 121 and 122 has a sleeve 131, 132, taking position on the child's shoulders and/or upper body, to improve the child's comfort and safety.

These sleeves are generally adjustable in respect of the height thereof, by sliding along the corresponding strap, so as to be suitably positioned at the child's shoulder and chest, according to the child's size.

In the embodiment described, each of these sleeves 131 and 132 contains an inflatable safety element 141, 142 (not shown in FIG. 1). The inflatable safety elements are folded and housed in the sleeves, so as to be deployed effectively, in the event of an impact.

In further embodiments, the inflatable safety elements may be incorporated directly into each strap.

Moreover, these inflatable safety elements 141 and 142 are connected by attachment means 15, attaching them together, when the child is positioned in the seat.

These attachment elements 15 comprise, in the embodiment illustrated, two flexible portions, or strips 151 and 152, each fitted with a respectively male and female buckle element, suitable for insertion into each other to attach the two strips 151 and 152, and suitable for separation from each other, by a suitable manual action (chosen such that the child in the seat cannot detach these attachment means him/herself).

According to this embodiment, the attachment means 15 also hold the two straps 121 and 122 in a sufficiently close position, when a child is sitting in the seat (chest clip function). This ensures that the straps are correctly positioned, and prevents the child from slipping an arm under one of the straps and/or removing one of the straps when the harness is buckled.

It is possible to envisage other types of attachment means, or to envisage a plurality of attachment means, for example sets of strips and buckles, one in the upper position and the other in the lower position of the safety elements, when deployed.

When positioning the child, the harness is thus conventionally positioned by placing the straps 131 and 132 on the child's shoulders (if applicable, the height of these straps and/or the sleeves may be adjusted), and these two straps are then attached to the crotch guard 123, using the buckle 124. The attachment means 15 are then attached. The child is released in reverse order, by detaching the attachment means 15, then detaching the attachment means 121, 122 and the crotch guard 123, via the buckle 124.

In the event of a significant impact, greater than a predetermined threshold, the two inflatable safety elements 141 and 142 are deployed automatically and very rapidly, from the sleeves 131 and 132, particularly to protect the child's head, and limit the forward movement thereof, as illustrated in FIG. 2A and 2B. As seen in these figures, the two inflatable safety elements 141 and 142 form the equivalent of a single bag, in that they are held in place by the attachment means 15. In this way, although these two elements 141 and 142 are each deployed on either side of the child, they are not separated from each other, and the child's head is not liable to continue moving between the two safety elements 141 and 142.

It should be noted that the shape of these safety elements 141 and 142 is in this case suitable for optimizing protection at the face, while also providing satisfactory protection of the head and neck.

According to further embodiments, the inflatable elements may also be devised and positioned to act, at least partly, on the child's chest. Moreover, further inflatable elements may be envisaged, for example in the seat structure and/or in the buckle of the harness.

In any case, it is understood that the assembly of the safety elements on the harness straps, and particularly in the sleeves, the positions whereof are adjustable according to the child's size, ensures correct positioning of the inflatable elements, when deployed, regardless of the child's size.

Attachment, for example via a seam or a tie on each strap of the harness, may be envisaged, to control the direction of deployment of the inflatable elements, and particularly prevent excessive upward deployment.

FIG. 3 represents an embodiment of the inflatable safety elements, shown flat and non-inflated. The two inflatable safety elements 141 and 142 are supplied, via a first end 1421, 1411 by a cylinder of a suitable fluid (not shown) connected to a supply inlet 31.

The two safety elements are continued by an intermediate portion 1412, 1422, to be essentially deployed around the child's neck, and end with two larger end portions 1413 and 1423, deployed in front of the child's head. These two ends 1413 and 1423 are equipped with attachment means 151 and 152.

In the embodiment illustrated, the two safety elements 141 and 142 are parts of the same airbag. According to a further embodiment, two independent inflatable elements may be involved.

Figure 4:
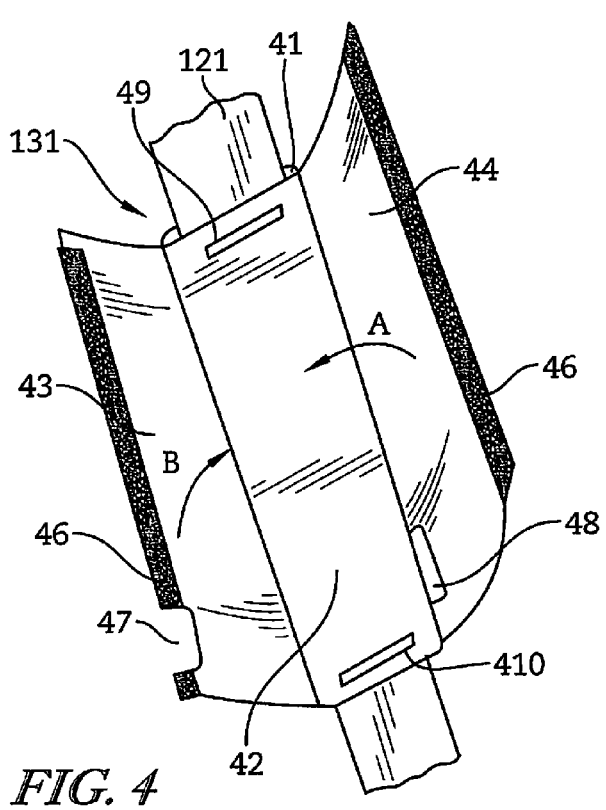
FIG. 4 shows more specifically a sleeve intended for the seat in FIGS. 1 and 2, before fitting one of the inflatable elements.
Figure 5:
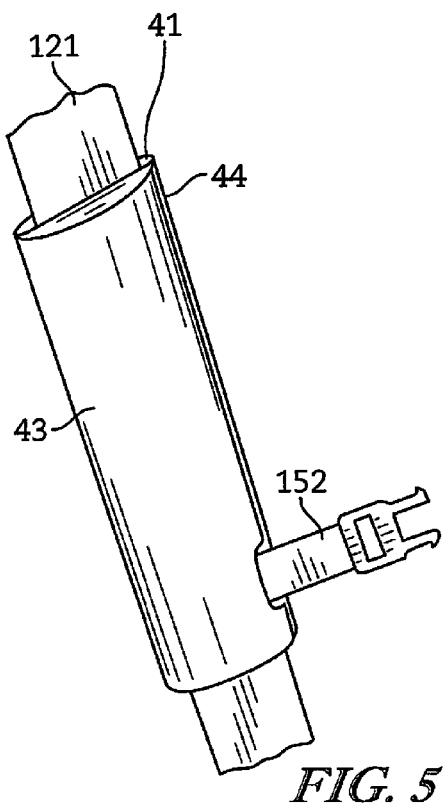
FIG. 5 shows the sleeve in FIG. 4, after fitting the inflatable element.

These inflatable safety elements 141 and 142 are, in the embodiment illustrated, housed in the sleeves 131 and 132, in a housing as illustrated in FIGS. 4 and 5. FIG. 4 shows an open sleeve, for receiving the inflatable element (not yet fitted). FIG. 5 shows the closed sleeve, i.e. in the usual position of use (in the absence of an impact causing the deployment of the inflatable element), wherein the inflatable element is folded (and not visible) in the housing thereof.

This embodiment is advantageous, since the sleeves are movable along the straps, and always positioned in the upper part of the child's body, at or in the vicinity of the shoulders (moreover, techniques have been proposed, for controlling correct sleeve positioning). In this way, regardless of the child's size, the safety elements are deployed in an optimized manner, at the child's neck and face.

In a further embodiment, the inflatable safety elements may be positioned on the harness and configured substantially lower, at the child's chest. They are then deployed substantially below the child's head. This increases the contact area of the child's body with these inflatable elements, while preventing significant movement of the head, without requiring a very significant inflated volume.

According to further embodiments, however, the safety elements may be housed in the harness, or in a specific part mounted thereon. Preferentially, attachment means are provided, for connecting them together. This connection may be made directly between the inflatable elements, or indirectly, at the straps or sleeves. In the latter case, the inflatable elements may be attached to the straps or to the sleeves, for example by stitching and/or insertion in a housing.

In the embodiment in FIG. 4, a specific housing is provided in the sleeve, for receiving the inflatable safety elements (in a simplified version, the inflatable element may be merely inserted between the sleeve and the strap).

The sleeve thus comprises, conventionally, an area 41 for circulating the strap 121. Furthermore, a housing is defined for the inflatable element 141, consisting in this case of a back end 42 and two flexible flaps 43, 44, folding back onto each other (successively arrows A and B). In a further embodiment, a single flap may be envisaged.

The flap(s) may be attached together and/or with a further portion of the harness using snap fasteners, securing means such as Velcro® 45, 46, a seam, gluing, etc. These various means are chosen so as to be fusible, i.e. they yield when the inflatable elements are inflated, without impeding the deployment thereof.

In this way, when the airbags are deployed, the pressure is sufficient to detach the flaps, and enable the deployment of the two safety elements 141, 142.

The flaps have slots or openings 47, 48, for inserting the attachment means 151 or 152.

A seam of the inflatable element, or another type of attachment, on the harness or the sleeve may be provided, for better control, if required, of the deployment of the inflatable elements in the desired direction.

In particular, each inflatable element is advantageously connected to the sleeve by two seams 49, 410 (which are not fusible, i.e. strong enough not to yield during the deployment of the inflatable element), situated in the upper part (at the child's shoulder) and in the lower part (at the child's chest), respectively. These seams 49, 410 substantially correspond to the positions of the arrows C and D (FIG. 3) on the inflatable element, respectively.

Figure 6:
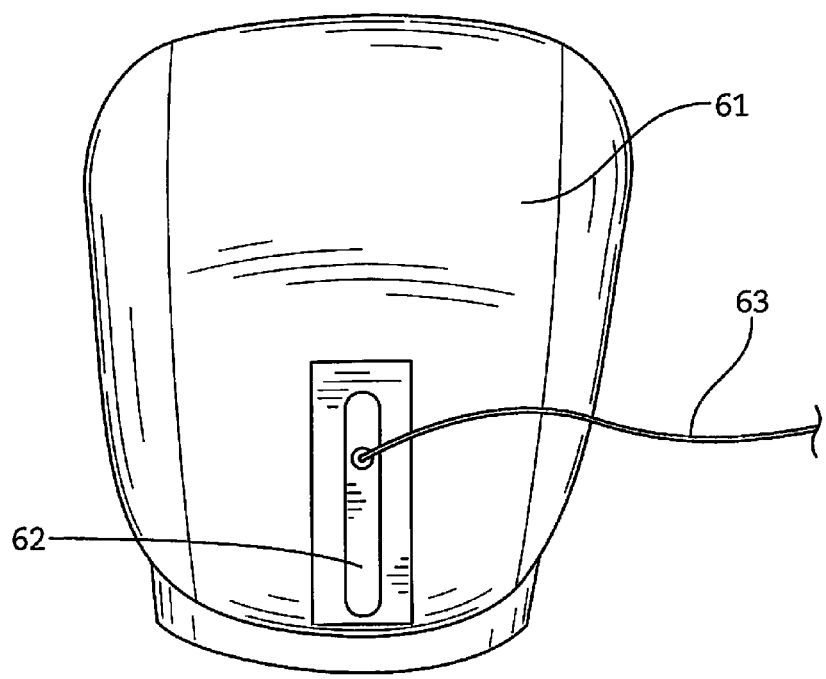
FIG. 6 represents the rear of the car seat in FIGS. 1 and 2, equipped with a cylinder for inflating the inflatable elements.

As illustrated in FIG. 6, the means for inflating the safety elements may be housed in the back section 61 of the seat. They comprise a cylinder 62, containing a fluid suitable for the immediate inflation of the two safety elements. This fluid may particularly be a gas such as helium, nitrogen or carbon dioxide.

This cylinder 62 is placed in a housing provided for this purpose. This housing may, depending on the case, by placed in the back section, seat section or base of the car seat, in any suitable position. A tube 63 is connected to the fluid supply inlet 31 (FIG. 3).

Inflation should obviously only be activated in the event of a sufficiently significant impact. A suitable predetermined threshold is thus defined.

Figures 7, 8:
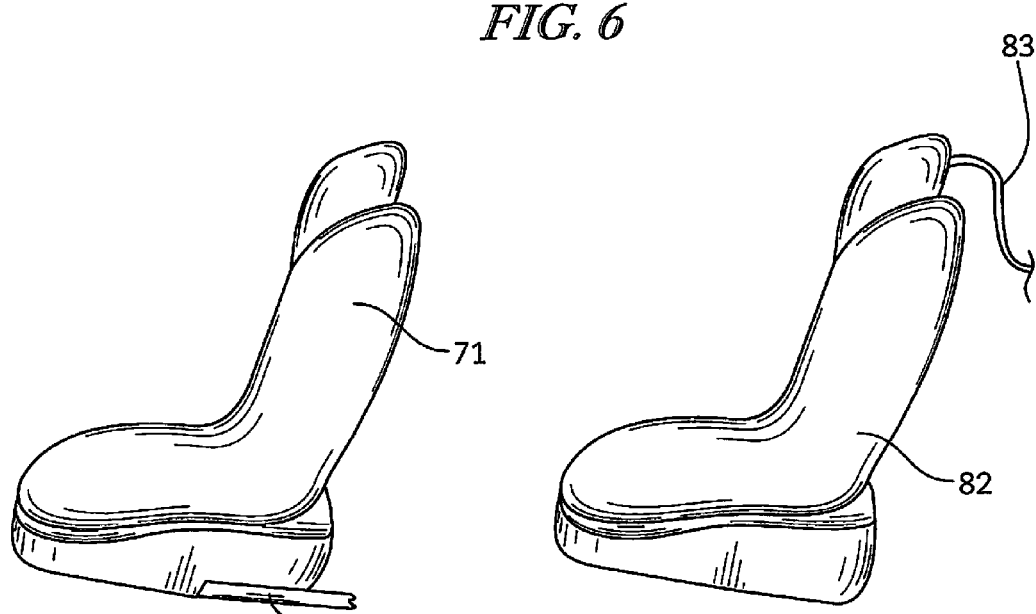
FIG. 7 illustrates a first example of installation of a sensor for activating the inflatable elements, in an Isofix® clip.
FIG. 8 illustrates a second embodiment of an activation sensor, positioned at the upper headrest strap.

A plurality of methods for detecting this threshold may be envisaged. For example, as illustrated in FIG. 7, in the case of a car seat 71 equipped with Isofix® clips 72 for attaching the car seat 71 to rings provided for this purpose in the vehicle seat, this activation may be carried out via a mechanical fuse or a sensor (not shown), directly connected to or integrated in one and/or the other of the Isofix® clips 72. Indeed, the clip is subjected to movement during an impact or an accident, that can be made use of to control activation.

Figure 11:
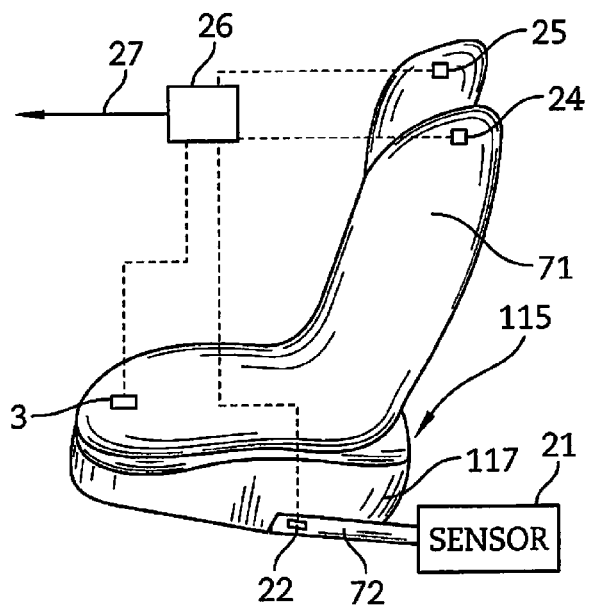
FIG. 11 illustrates an example of a car seat including at least one fuse or one sensor for activating the inflation of inflatable elements.

As another example, as illustrated in FIG. 11, the car seat 11 includes a seat foundation 115. The seat foundation 115 illustratively includes a seat base 117 and clips 72 such as, for example, Isofix® clips coupled to the seat base 117. In some embodiments, a sensor 21 is coupled to the seat foundation 115 to detect the threshold and cause activation. In other embodiments, the sensor 21 is coupled to the Isofix® clips 72 to detect the threshold and cause activation. The sensor 21 confirms it is properly latched and is linked to a computer means 26. It is within the scope of this disclosure to mount a sensor to the seat base 117.

Figure 12:
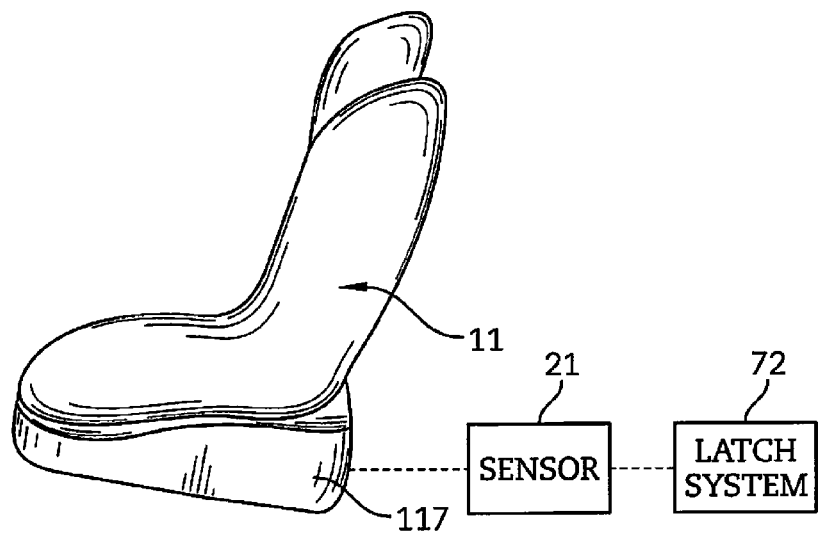
FIG. 12 illustrates another example of a car seat including at least one sensor to detect the attachment of clips to corresponding hooks.

In some embodiments, a LATCH system (Lower Anchors and Tethers for Children) is used to anchor the car seat 11 in a proper position in a passenger seat as shown in FIG. 12. In such embodiments, clips 72 are provided on straps coupled to the seat 11 and the clips are coupled by a caregiver to anchor hooks provided in a stationary position in a crevice formed in the vehicle passenger seat between a passenger seat bottom and a passenger seat back.

More generally, a plurality of sensors 21, 22, 23, 24, 25, such as fuses or accelerometers or the like, can be installed in the seat and/or the base, to analyze in an efficient way the situation, and to decide to inflate, or not, the airbags. Computer means 26 can be provided, to carry out this analysis in accordance with the present disclosure. Illustratively, the computer means 26 is linked to sensors 21, 22, 23, 24, 25 and arranged to analyze the data provided by the sensors 21, 22, 23, 24, 25 to generate an activation signal 27.

Specific sensors can be provided to detect frontal impact and/or lateral impact. In the illustrative embodiment, the car seat 11 includes at least one frontal impact sensor 23. The car seat 11 further includes at least one lateral impact sensor 24, 25.

Signals provided by the vehicle may be used, to improve the analysis, or to control directly the inflation. As a matter of fact, vehicles are equipped with corresponding means, to control their own airbags, and the corresponding signals can be transmitted and used by the child seat.

According to a further approach, illustrated in FIG. 8, in the case of a seat 82, equipped with a strap 83 fitted in the upper part of the back section (or the base of the seat), and to be connected to a coupling element in the vehicle (strap referred to as "top tether"), activation may be carried using a fuse connected directly to this strap 83, or to means for coupling therewith, on the back section or the base. Once again, it is thus possible to make use of the movement of the upper portion of the seat, following an impact or an accident.

In some embodiments, a fuse or a sensor can be provided on a support leg of the seat (or of the corresponding base).

Moreover, in some embodiments, the safety elements may not be inflated, even in the event of a significant impact (and thus even if activation means require such inflation), if the seat is not occupied by a child.

Various means for detecting presence are already known. In this way, this detection may for example be carried out using a weight sensor positioned under the seat section, or a suitably positioned contact, for example in the back section or seat section.

According to one particular approach, these detection means consist of or engage with the strips 151 and 152, and output information relating to the presence of a child when said attachment means are attached.

In this way, it is easy to determine the child's presence, for example via a closed electrical contact when the chest clip is locked. The information is directly available in the vicinity of the inflatable elements, and may be combined, for example via a logical AND in the activation means, with a signal output by a fuse detecting an impact greater than the predetermined threshold.

In the embodiment described above, the car seat is fitted with a "5 point" type harness. Obviously, the invention may be applied to other types of harness, provided that two straps thereof can receive two inflatable safety elements. Moreover, the invention is not only applicable to car seats, but may also be used in other child care devices, such as pushchairs, carry cots, etc.

According to another embodiment of the invention, the inflatable safety elements 131, 132 are not systematically attached together when the child is installed in the seat, but when the inflation is needed. In this case, attachment means are controlled by the signal also controlling the inflation, so that an automatic attachment is provided, before or during inflation. The shape and/or the inflating of airbags 141, 142 can be adapted so that these attachment means are directed one towards the other and attached without human intervention.

Figure 9A:
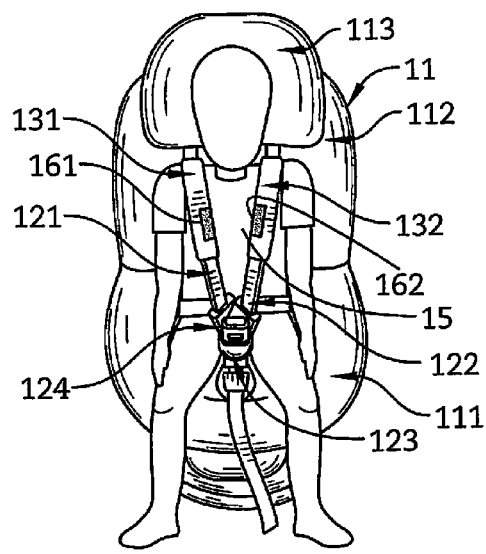
FIG. 9A illustrates on example of means for reversibly attaching the inflatable elements together during their inflation.
Figure 9B:
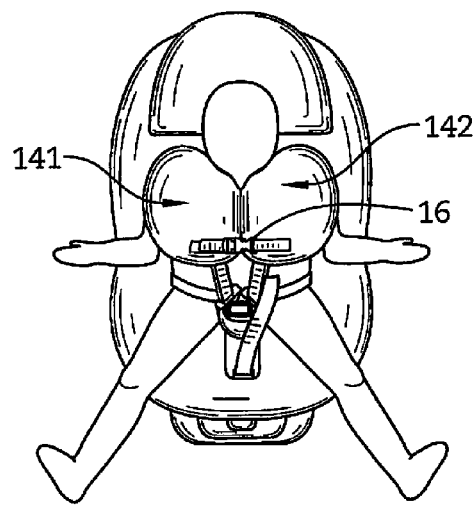
FIG. 9B illustrates the car seat of FIG. 9A, the inflatable elements having been deployed and reversibly attached.

As shown in FIGS. 9A-9B, the sleeves 131, 132 include attachment means 16. In other embodiments, the attachment means 16 is coupled to straps 121, 122. The attachment means 16 includes attachment elements 161, 162 attached to sleeves 131, 132, respectively. When inflation occurs, attachment elements 161, 162 are directed toward the other one (e.g., due to the shape of inflatable elements 141, 142 and/or with magnetic means). When the attachment elements 161, 162 are in contact, latch means are activated so the at the attachment elements 161, 162 act as an attachment 16, as shown in FIG. 9B.

According to another embodiment of the invention, the airbags 141, 142 are mounted on the back 112 and/or the headrest 113 of the seat 11, in the vicinity of the head of the child. As previously disclosed, attachment means are provided, to attach both airbags, preventing said airbags from being separated from each other, notably when the head of the child comes in contact with them.

Figure 10A:
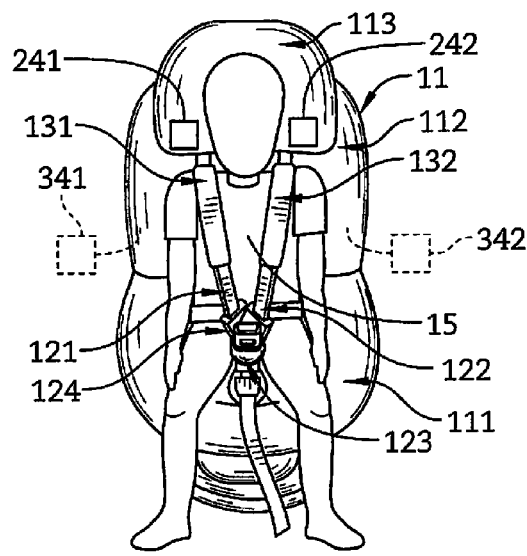
FIG. 10A illustrates an example of a car seat equipped with inflatable elements mounted in a back and a headrest.
Figure 10B:
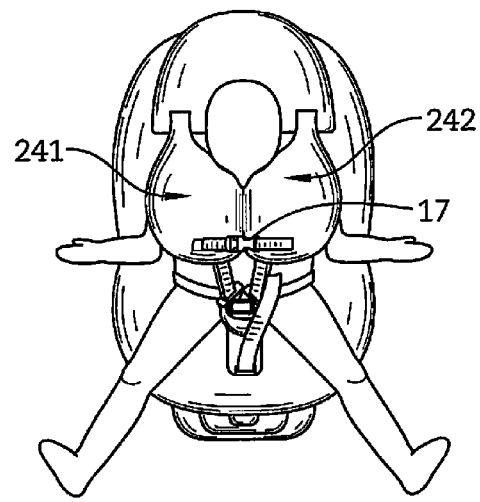
FIG. 10B illustrates the car seat of FIG. 10A, the inflatable elements having been deployed.

As illustrated in FIGS. 10A and 10B, inflatable elements 241, 242 are mounted in the headrest 113. An attachment means 17 is coupled to the headrest 113. The attachment means 17 is substantially similar to attachment means 16. Illustratively, the car seat 11 includes inflatable elements 341, 342 mounted in the back section 112. When inflation occurs, the attachment means 17 activates as shown in FIG. 10B.

The invention claimed is:

1. Child care device suitable for receiving a child, comprising at least two inflatable safety elements suitable for being inflated in the event of an impact above a predetermined threshold, and means for reversibly attaching said inflatable safety elements together.

2. Child care device according to claim 1, comprising a harness having two straps designed for extending from the shoulders along a child's chest, wherein each of the straps is equipped with one of said inflatable safety elements.

3. Child care device according to claim 2, wherein said means for reversibly attaching comprise at least two flexible portions attached by a first of the ends thereof to either of said inflatable elements, respectively, and having at the second ends thereof additional coupling means, designed so as to extend transversally between the straps, when they are attached.

4. Child care device according to claim 3, wherein said flexible portions, when the coupling means thereof are attached, also hold the straps together.

5. Child care device according to claim 2, wherein each of said inflatable safety elements is attached to one of said straps respectively.

6. Child care device according to claim 2, wherein said straps each have a sleeve, that is slidable along the strap, and in that said inflatable safety elements are housed in said sleeves.

7. Child care device according to claim 6, wherein said sleeves have at least one movable flap, suitable for forming a housing for one of said inflatable safety elements.

8. Child care device according to claim 6, wherein each of said inflatable safety elements is attached to one of said sleeves via two connections, in the vicinity of each of the ends of said sleeve, respectively.

9. Child care device according to claim 6, wherein said inflatable safety elements are attached to said sleeves by stitching.

10. Child care device according to claim 6, wherein each of said sleeves has a side opening for inserting said means for reversibly attaching.

11. Child care device according to claim 1, wherein said inflatable safety elements are configured so as to define, when inflated, lateral protection on the child's neck and the equivalent of a central bag at the child's head, by the end portions thereof connected together by attachment means.

12. Child care device according to claim 1, wherein said inflatable safety elements are supplied with at least one source of fluid.

13. Child care device according to claim 12, wherein said at least one source of fluid is housed in the back section of a seat.

14. Child care device according to claim 1, wherein it comprises at least one fuse or one sensor for activating the inflation of said inflatable safety elements mounted:
on a clip for attaching said child care device to a hook provided for this purpose in a motor vehicle and/or
on a strap for attaching the upper part of the back section, or a corresponding base, to the motor vehicle, or on means rigidly connected to said strap.

15. Child care device according to claim 1, wherein it comprises electronic means for activating the inflation of said inflatable safety elements, such as at least one deceleration sensor and/or a control signal output by a vehicle wherein said device is fitted.

16. Child care device according to claim 1, wherein it comprises means for detecting the presence of a child, only authorizing the inflation of the inflatable safety elements in the presence of a child in said child care device.

17. Child care device according to claim 16, wherein said detection means are formed or engage with said means for attaching said inflatable safety elements together, and output information relating to the presence of a child when said coupling means are attached.

18. Child care device according to claim 1, wherein it comprises means for detecting a correct installation of the device in a vehicle, only authorizing the inflation of the inflatable safety elements if said child care device is correctly installed.

19. Child care device according to claim 18, wherein said means for detecting a correct installation comprises sensors to detect the attachment of clips to corresponding hook provided for this purpose in said vehicle.

20. Child care device according to claim 1, wherein said inflatable safety elements are mounted in a seatback or a headrest.

21. Child care device according to claim 1, wherein means for reversibly attaching said inflatable safety elements together are attached together during their inflation.

22. Child care device according to claim 1, wherein it comprises sensors to detect said impact above a predetermined threshold.

23. Child care device according to claim 1, wherein said sensors comprises at least one frontal impact sensor and/or at least one lateral impact sensor.

24. Child care device according to claim 21, wherein said means for reversibly attaching said inflatable safety elements together comprise attachment means which are directed toward the other when inflation of said inflatable safety elements occurs.

25. Child care device suitable for receiving a child, comprising at least two inflatable safety elements suitable for being inflated in the event of an impact above a predetermined threshold, and means for reversibly attaching said inflatable safety elements together, wherein said means for reversibly attaching said inflatable safety elements together are attached together during their inflation.

26. Child care device suitable for receiving a child, comprising at least two inflatable safety elements suitable for being inflated in the event of an impact above a predetermined threshold, and means for reversibly attaching said inflatable safety elements together, wherein said device comprises a harness having two straps designed for extending from the shoulders along a child's chest, wherein each of the straps is equipped with one of said inflatable safety elements, and
wherein said attachment means comprise at least two flexible portions attached by a first of the ends thereof to either of said inflatable elements, respectively, and having at the second ends thereof additional coupling means, designed so as to extend transversally between the straps, when they are attached.

27. Child care device suitable for receiving a child, comprising at least two inflatable safety elements suitable for being inflated in the event of an impact above a predetermined threshold, and means for reversibly attaching said inflatable safety elements together, wherein said inflatable safety elements are configured so as to define, when inflated, lateral protection on the child's neck and the equivalent of a central bag at the child's head, by the end portions thereof connected together by attachment means.

28. Child care device suitable for receiving a child, comprising at least two inflatable safety elements suitable for being inflated in the event of an impact above a predetermined threshold, flexible means for attaching said inflatable safety elements together and fluid means for inflating the two inflatable safety elements.

29. Child care device suitable for receiving a child, comprising at least two inflatable safety elements suitable for being inflated in the event of an impact above a predetermined threshold, means for automatically attaching said inflatable safety elements together upon being inflated.

\* \* \* \* \*